United States Patent
Sugisawa et al.

(10) Patent No.: US 10,547,194 B2
(45) Date of Patent: Jan. 28, 2020

(54) POWER SUPPLY CONTROL APPARATUS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Yuuki Sugisawa, Mie (JP); Shunichi Sawano, Mie (JP); Kota Oda, Mie (JP); Keisuke Mase, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 66 days.

(21) Appl. No.: 15/776,559

(22) PCT Filed: Nov. 28, 2016

(86) PCT No.: PCT/JP2016/085225
§ 371 (c)(1),
(2) Date: May 16, 2018

(87) PCT Pub. No.: WO2017/094681
PCT Pub. Date: Jun. 8, 2017

(65) Prior Publication Data
US 2018/0331556 A1 Nov. 15, 2018

(30) Foreign Application Priority Data
Dec. 3, 2015 (JP) .................................. 2015-236934

(51) Int. Cl.
*H02J 7/00* (2006.01)
*B60R 16/03* (2006.01)

(52) U.S. Cl.
CPC ............ *H02J 7/0081* (2013.01); *B60R 16/03* (2013.01); *H02J 7/0068* (2013.01)

(58) Field of Classification Search
CPC .................................................... H02J 7/0081
(Continued)

(56) References Cited

U.S. PATENT DOCUMENTS 8,054,605 B2 * 11/2011 Takahashi ............... H02M 1/08
361/94
2007/0146951 A1 6/2007 Takahashi et al.
(Continued)

FOREIGN PATENT DOCUMENTS

DE 102014208257 A1 11/2015
JP 2001217696 A 8/2001
(Continued)

OTHER PUBLICATIONS

Search Report for PCT/JP2016/085225, dated Jan. 17, 2017.
Extended European Search Report, Application No. EP 16 870 618.2, dated Nov. 9, 2018.

*Primary Examiner* — Edward Tso
*Assistant Examiner* — Ahmed H Omar
(74) *Attorney, Agent, or Firm* — Honigman LLP

(57) ABSTRACT

In a power supply control apparatus, if a switching signal input from a microcomputer to a control circuit instructs switching on of a semiconductor switch, when an input voltage that is input to the drain of the semiconductor switch is higher than or equal to a predetermined voltage, the control circuit drives a charging circuit. The charging circuit charges a capacitor (Cs) via a diode (D1). Accordingly, a voltage at the gate of the semiconductor switch taking a potential at the source of the semiconductor switch as a reference becomes higher than or equal to a predetermined voltage, and thus the semiconductor switch is switched on. While driving the charging circuit, the control circuit keeps
(Continued)

driving the charging circuit even if the input voltage becomes lower than the predetermined voltage.

4 Claims, 10 Drawing Sheets

(58) Field of Classification Search
USPC .......................................... 320/134, 136, 166
See application file for complete search history.

(56) References Cited

U.S. PATENT DOCUMENTS

| 2009/0052096 A1 | 2/2009 | Takahashi et al. |
| 2013/0076324 A1 | 3/2013 | Fujii |

FOREIGN PATENT DOCUMENTS

| JP | 2003-092874 A | 3/2003 |
| JP | 2013-241080 A | 12/2013 |

* cited by examiner

| State | | | | Result | |
|---|---|---|---|---|---|
| Switching Signal | Input-voltage Detection Unit | Comparator | Output Voltage from AND Circuit | Charging Circuit | Discharging Circuit |
| L | — | — | — | L | H |
| H | — | H | — | L | H |
| H | H | L | — | H | L |
| H | L | L | L | L | H |
| H | L | L | H | H | L |

FIG. 9

| Switching Signal | State | | | | | | Result | |
|---|---|---|---|---|---|---|---|---|
| | Input-voltage Detection Unit | Comparator | Output voltage from AND circuit | Terminal-to-Terminal Voltage Detection Unit | Filter Unit | Latch Unit | Charging Circuit | Discharging Circuit |
| L | — | — | — | — | — | — | L | H |
| H | — | H | — | — | — | H | L | H |
| H | H | L | — | H | L | L | H | L |
| H | H | L | — | L | L | H | L | H |
| H | L | L | — | H | — | H | H | L |
| H | L | L | H | L | — | L | L | H |
| H | L | L | H | H | — | — | H | L |
| H | L | L | L | — | — | — | L | H |

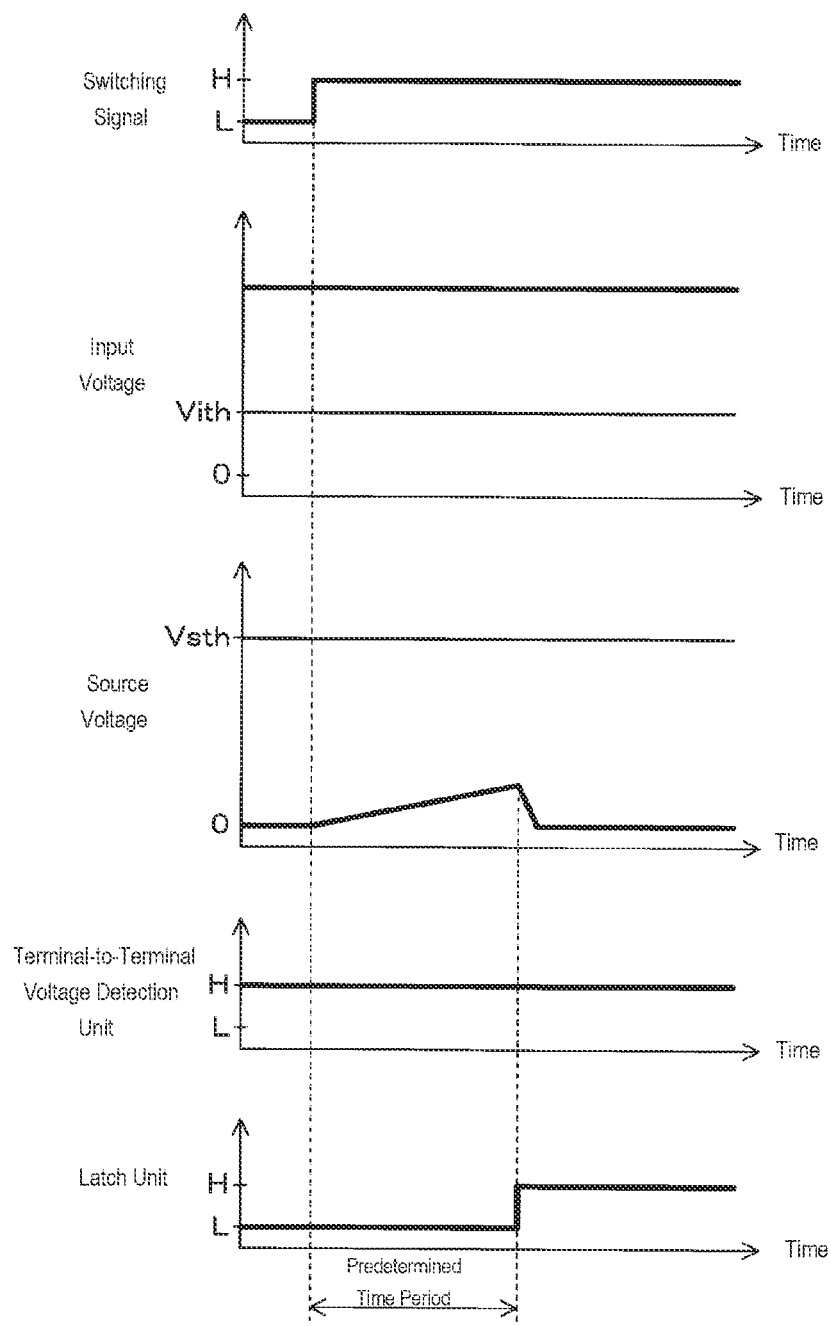

POWER SUPPLY CONTROL APPARATUS

CROSS-REFERENCE TO RELATED APPLICATIONS

This application is the U.S. national stage of PCT/JP2016/085225 filed Nov. 28, 2016, which claims priority of Japanese Patent Application No. 2015-236934 filed on Dec. 3, 2015, which is incorporated herein by reference in its entirety.

FIELD OF THE INVENTION

The present description relates to a power supply control apparatus for controlling power supply through a current path by switching a switch provided in the current path on or off.

BACKGROUND OF THE INVENTION

A vehicle may be equipped with a power supply control apparatus that controls power supply from a battery to a load (see JP 5408352B, for example). The power supply control apparatus disclosed in Patent Document 1 includes an N-channel FET (Field Effect Transistor) that functions as a semiconductor switch, and this FET is provided in a current path from a positive electrode of a battery to one end of a load. By switching this FET on or off, power supply through the current path is controlled. The positive electrode of the battery and the one end of the load are respectively connected to the drain and source of the FET, whereas the negative electrode of the battery and the other end of the load are grounded.

The power supply control apparatus disclosed in JP 5408352B further includes a charging circuit that charges a capacitor, a so-called input capacitance, provided between the drain and gate of the FET. When the FET is switched on, the charging circuit charges this capacitor by supplying current to the capacitor from the gate side. As a result, a voltage at the gate becomes higher than or equal to a predetermined voltage, and thus the FET is switched on. For charging the capacitor, the charging circuit outputs, to the gate of the FET, a voltage higher than an input voltage that is input from the battery to the drain of the FET, and charges the capacitor.

SUMMARY OF THE INVENTION

Among conventional power supply control apparatuses such as the one disclosed in JP 5408352B, there are some power supply control apparatus that generate, in accordance with the input voltage that is input from the battery to the drain of the FET, a constant voltage that is lower than the input voltage, and generate a voltage to be output to the gate of the FET using the generated constant voltage.

In such a configuration, if the input voltage that is input from the battery to the gate of the FET falls significantly and becomes lower than the constant voltage, the charging circuit cannot generate an appropriate voltage, and thus the FET is not appropriately switched on. Accordingly, in conventional power supply control apparatuses that generate the constant voltage in accordance with the input voltage, if the input voltage is lower than a specific voltage, power that is accumulated in the capacitor is discharged, thus switching the FET off.

However, in such a conventional power supply control apparatus, if the FET is on and the load operates, when the input voltage becomes lower than the specific voltage, the FET is switched off. As a result, there is a problem that power supply from the battery to the load through the current path is suddenly cut off, and thus the load stops operating.

The present description was made in view of the above circumstances, and it is an object of the present description to provide a power supply control apparatus that can prevent a sudden cutoff of power supply thorough the current path caused by fall of the input voltage.

A power supply control apparatus according to the present description includes a semiconductor switch that is provided in a current path and is switched on if a voltage at its control terminal becomes higher than or equal to a predetermined voltage, whereas is switched off if the voltage at the control terminal becomes lower than the predetermined voltage, the power supply control apparatus being configured to control power supply through the current path by switching the semiconductor switch on or off includes: a capacitor whose one end is connected to the control terminal; a charging circuit configured to charge the capacitor; a diode configured to prevent a current from flowing through the charging circuit from the capacitor; an input-voltage detection unit configured to detect an input voltage that is input to a current input terminal in the semiconductor switch; an input unit to which a switching signal instructing switching the semiconductor switch on or off is input; and a driving unit configured to, if the switching signal input to the input unit instructs switching on of the semiconductor switch, drive the charging circuit when the voltage that the input-voltage detection unit has detected is higher than or equal to an input-voltage threshold value. Furthermore, while operating the charging circuit, the driving unit keeps driving the charging circuit even if the voltage that the input-voltage detection unit has detected becomes lower than the input-voltage threshold value.

In the present description, if the switching signal, which was input, instructs switching on of the semiconductor switch provided in the current path, when the input voltage that is input to a current input terminal in the semiconductor switch is higher than or equal to the input-voltage threshold value, the charging circuit is driven. The charging circuit charges, via the diode, the capacitor whose one end is connected to the control terminal of the semiconductor switch, for example, charges the input capacitance. As a result, the voltage at the control terminal becomes higher than or equal to the predetermined voltage, and thus the semiconductor switch is switched on.

While the charging circuit is being driven, even if the input voltage becomes lower than the input-voltage threshold value, the charging circuit is kept operating. Even if the voltage that the charging circuit outputs to the capacitor falls in accordance with fall of the input voltage, because the diode is provided, the capacitor does not discharge power, and thus the voltage at the control terminal is kept. Accordingly, the semiconductor switch is not switched off due to the fall of the input voltage, and thus a sudden cutoff of power supply through the current path is prevented.

The power supply control apparatus according to the present description may include: a terminal-to-terminal voltage detection unit configured to detect a voltage between the input terminal of the semiconductor switch and a current output terminal in the semiconductor switch; and a discharging circuit configured to discharge power that the capacitor has accumulated. Furthermore, if the driving unit drives the charging circuit, when the voltage that the input-voltage detection unit has detected becomes lower than the input-voltage threshold value and the voltage that the terminalto-terminal voltage detection unit has detected becomes higher than or equal to a terminal-to-terminal voltage threshold value, the driving unit stops operation of the charging circuit and drives the discharging circuit.

In the present description, while the charging circuit is driven, when the input voltage that is input to the input terminal of the semiconductor switch becomes lower than the input-voltage threshold value and the voltage between the input terminal and output terminal of the semiconductor switch becomes higher than or equal to the terminal-to-terminal voltage threshold value, the operation of the charging circuit is stopped and the discharging circuit is driven, and thus the semiconductor switch is switched off. Accordingly, even in a state where the input voltage has fallen, if the output terminal of the semiconductor switch is grounded, the voltage between the input terminal and output terminal of the semiconductor switch is kept at higher than or equal to the terminal-to-terminal voltage threshold value, and thus the semiconductor switch is switched off. In this manner, the flowing of an overcurrent to the semiconductor switch, caused by the output terminal of the semiconductor switch being grounded, is prevented.

The power supply control apparatus according to the present description may include: a terminal-to-terminal voltage detection unit configured to detect a voltage between the input terminal of the semiconductor switch and a current output terminal in the semiconductor switch; and a discharging circuit configured to discharge power that the capacitor has accumulated. Furthermore, if the driving unit drives the charging circuit and a voltage that the terminal-to-terminal voltage detection unit detects is higher than or equal to a terminal-to-terminal voltage threshold value continues for a predetermined time period or longer, the driving unit stops operation of the charging circuit and drives the discharging circuit.

In the present description, while the charging circuit is driven, in the state where the voltage between the input terminal and output terminal of the semiconductor switch is higher than or equal to the terminal-to-terminal voltage threshold value, that is, when the semiconductor switch is not switched on even though the charging circuit is driven, the operation of the charging circuit is stopped, the discharging circuit is driven, and then the semiconductor switch is switched off. If the semiconductor switch cannot be switched on due to malfunction, power supply through the current path is stopped, and thus wasteful power consumption is prevented.

The power supply control apparatus according to the present description may include: an output circuit configured to output a voltage within a predetermined range depending on a current flowing through the current path; and an adjusting unit configured to, if the driving unit stops the operation of the charging circuit and drives the discharging circuit, adjust the voltage at a voltage output terminal from which the output circuit outputs the voltage to a voltage out of the predetermined range.

In the present description, the output circuit outputs a voltage according to the current flowing through the current path within the predetermined range. The voltage that the output circuit has output is used, for example, for calculating a temperature of an electric wire that constitutes the current path. Due to a predetermined condition being satisfied while the charging circuit is driven, when the semiconductor switch is switched off, the voltage at the voltage output terminal of the output circuit is adjusted to a voltage out of the predetermined range. As a result, it is notified that power supply through the current path cannot be normally performed.

According to the present description, a sudden cutoff of power supply through the current path, caused by fall of an input voltage, can be prevented.

BRIEF DESCRIPTION OF THE DRAWINGS

FIG. 9 is a table illustrating operations of the control circuit.

FIG. 11 is a timing chart illustrating other operations of the power supply control apparatus.

DETAILED DESCRIPTION OF THE PREFERRED EMBODIMENTS

Hereinafter, the present description will be described in detail with reference to the drawings showing embodiments.

Embodiment 1

Figure 1:
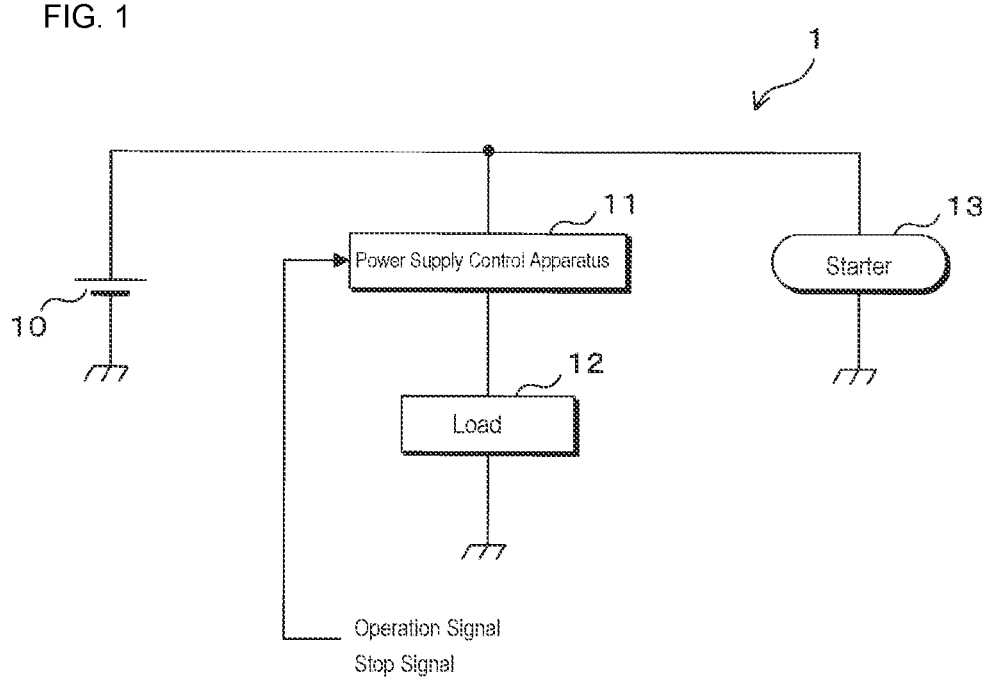
FIG. 1 is a block diagram illustrating a configuration of main portions of a power source system according to Embodiment 1.

FIG. 1 is a block diagram illustrating a configuration of main portions of a power source system 1 according to Embodiment 1. The power source system 1 is suitably mounted in a vehicle, and includes a battery 10, a power supply control apparatus 11, a load 12, and a starter 13. A positive electrode of the battery 10 is connected to one end of each of the power supply control apparatus 11 and the starter 13. The other end of the power supply control apparatus 11 is connected to one end of the load 12. A negative electrode of the battery 10, and the other ends of the load 12 and the starter 13 are grounded.

The battery 10 supplies power to the load 12 via the power supply control apparatus 11, and supplies power to the starter 13 as well. The load 12 is an electric apparatus mounted in the vehicle. The load 12 operates if power is supplied from the battery 10 to the load 12, whereas the load 12 stops operating if power supply from the battery 10 to the load 12 is cut off. The starter 13 is a motor for starting an engine (not shown) and operates using power supplied from the battery 10.

An operation signal instructing operation of the load 12 and a stop signal instructing stop of operation of the load 12 are input to the power supply control apparatus 11. The power supply control apparatus 11 controls the supply of power to the load 12 in accordance with the input signal.

While the starter 13 operates, a large current is supplied from the battery 10 to the starter 13. A current is supplied to the load 12 or the starter 13 via an internal resistance (not shown) in the battery 10. If the battery 10 supplies power to the starter 13, an output voltage from the battery 10 falls significantly, because a range of a voltage drop in the internal resistance is large.

Figure 2:
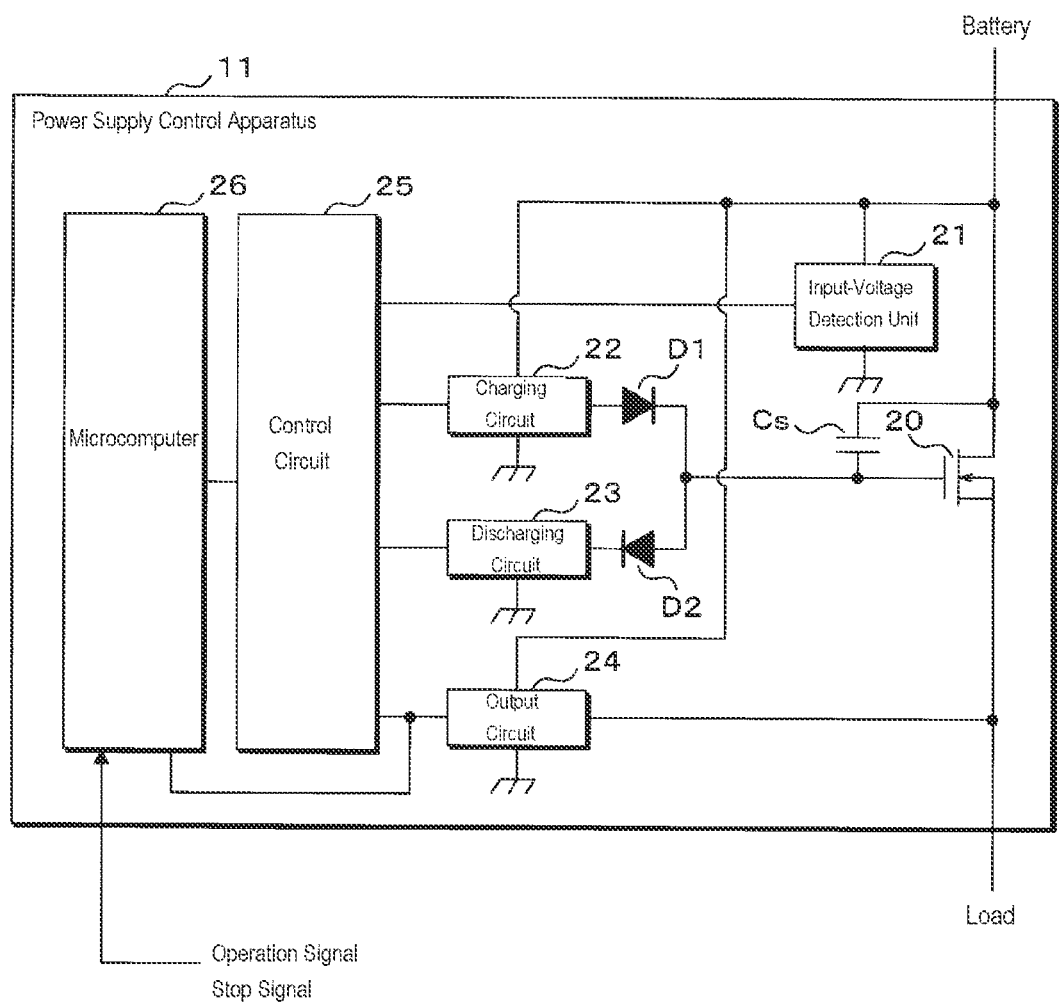
FIG. 2 is a block diagram illustrating a configuration of main portions of a power supply control apparatus.

FIG. 2 is a block diagram illustrating a configuration of main portions of the power supply control apparatus 11. The power supply control apparatus 11 includes a semiconductor switch 20, an input-voltage detection unit 21, a charging circuit 22, a discharging circuit 23, an output circuit 24, a control circuit 25, a microcomputer 26, a capacitor Cs, and diodes D1 and D2. The semiconductor switch 20 is an N-channel FET. The capacitor Cs is an input capacitance that is formed together with manufacturing of the semiconductor switch 20.

The drain of the semiconductor switch 20 is connected to the positive electrode of the battery 10, whereas the source of the semiconductor switch 20 is connected to the one end of the load 12. The capacitor Cs is connected between the drain and gate of the semiconductor switch 20. The drain of the semiconductor switch 20 is further connected to the input-voltage detection unit 21, the charging circuit 22, and the output circuit 24. The input-voltage detection unit 21, the charging circuit 22, and the output circuit 24 are grounded, and are separately connected to the control circuit 25. The output circuit 24 is also connected to the source of the semiconductor switch 20 and the microcomputer 26.

The gate of the semiconductor switch 20 is connected to, in addition to the capacitor Cs, the cathode of the diode D1 and the anode of the diode D2. The anode of the diode D1 is connected to the charging circuit 22. The cathode of the diode D2 is connected to the discharging circuit 23. The discharging circuit 23 is grounded and also connected to the control circuit 25. The control circuit 25 is further connected to the microcomputer 26.

A high-level voltage or a low-level voltage is input to the charging circuit 22 from the control circuit 25. If a high-level voltage is input to the charging circuit 22 from the control circuit 25, the charging circuit 22 outputs, to the capacitor Cs via the diode D1, a voltage that is higher than the input voltage that is input from the battery 10 to the drain of the semiconductor switch 20. Accordingly, a current is supplied to the capacitor Cs from the gate side of the semiconductor switch 20, and thus the capacitor Cs is charged. By the capacitor Cs being charged, the voltage at the gate of the semiconductor switch 20 taking the potential at the source of the semiconductor switch 20 as a reference rises. The diode D1 prevents a current from flowing through the charging circuit 22 from the capacitor Cs.

If the voltage at the gate of the semiconductor switch 20 taking the potential at the source of the semiconductor switch 20 as a reference becomes higher than or equal to a predetermined voltage, the semiconductor switch 20 is switched on, thus enabling a current to flow between the drain and source of the semiconductor switch 20. If the semiconductor switch 20 is on, the resistance value between the drain and source of the semiconductor switch 20 is small.

If the semiconductor switch 20 is on, a current is input from the battery 10 to the drain of the semiconductor switch 20, and is output from the source of the semiconductor switch 20 to the load 12. By the supply of this current, power is supplied to the load 12. In this manner, in the power supply control apparatus 11, a current path from the battery 10 to the load 12 is provided, and the semiconductor switch 20 is provided in this current path. The drain, the source, and the gate of the semiconductor switch 20 respectively function as an input terminal, an output terminal, and a control terminal.

If the semiconductor switch 20 is on, the voltages at the drain and source of the semiconductor switch 20 taking a ground potential as a reference are approximately equal. Also, the charging circuit 22 generates, in accordance with the input voltage that is input from the battery 10 to the drain of the semiconductor switch 20, a constant voltage that is lower than the input voltage, and generates a voltage that is higher than the input voltage using the generated constant voltage. If a low-level voltage is input to the charging circuit 22 from the control circuit 25, the charging circuit 22 stops operating.

A high-level voltage or a low-level voltage is input also to the discharging circuit 23 from the control circuit 25. If a high-level voltage is input to the discharging circuit 23 from the control circuit 25, the discharging circuit 23 discharges the power that has accumulated in the capacitor Cs. At this time, the cathode of the diode D2 is grounded via a resistor (not shown) in the discharging circuit 23, and then a current flows from the capacitor Cs to the ground potential via the diode D2 and the resistor in the discharging circuit 23. Accordingly, a voltage across the capacitor Cs, that is, the voltage at the source of the semiconductor switch 20 taking the potential at the gate of the semiconductor switch 20 as a reference falls. In the semiconductor switch 20, if the voltage at its gate taking the potential at its source as a reference becomes lower than the predetermined voltage, the semiconductor switch 20 is switched off, and thus no current flows between the drain and source of the semiconductor switch 20. At this time, the semiconductor switch 20 is turned off, and thus power supply from the battery 10 to the load 12 is cut off.

If a low-level voltage is input to the discharging circuit 23 from the control circuit 25, the discharging circuit 23 stops operating. At this time, in the discharging circuit 23, the cathode of the diode D2 is opened. The power supply control apparatus 11 controls the supply of power to the load 12 through the current path by switching the semiconductor switch 20 on or off.

The input-voltage detection unit 21 detects the input voltage that is input from the battery 10 to the drain of the semiconductor switch 20. If the detected input voltage is higher than or equal to an input-voltage threshold value that is predetermined, the input-voltage detection unit 21 outputs a high-level voltage to the control circuit 25. If the detected input voltage is lower than the input-voltage threshold value, the input-voltage detection unit 21 outputs a low-level voltage to the control circuit 25. While the starter 13 operates, the input voltage falls to a voltage that is lower than the input-voltage threshold value. Accordingly, while the starter 13 operates, the input-voltage detection unit 21 outputs a low-level voltage.

The output circuit 24 outputs a voltage proportional to the magnitude of the current flowing through the current path from the battery 10 to the load 12. A voltage output terminal from which the output circuit 24 outputs a voltage is connected to the control circuit 25 and the microcomputer 26, and the output circuit 24 outputs, to the control circuit 25 and the microcomputer 26, the voltage proportional to the magnitude of the current flowing through the current path.

The voltage that the output circuit 24 outputs from its voltage output terminal to the control circuit 25 and the microcomputer 26 is given by "the magnitude of the current flowing through the current path"×"a predetermined number". Accordingly, the larger the current flowing through the current path is, the higher the voltage that the output circuit 24 outputs to the control circuit 25 and the microcomputer 26 is.

In accordance with the input voltage that is input from the battery 10 to the drain of the semiconductor switch 20, the output circuit 24 generates a voltage that is output to the control circuit 25 and the microcomputer 26. The voltage that the output circuit 24 outputs to the control circuit 25 and the microcomputer 26 is a voltage within a predetermined range. In other words, an upper limit voltage is set for the voltage that the output circuit 24 outputs, and the output circuit 24 outputs, to the control circuit 25 and the microcomputer 26, a voltage that is lower than or equal to the upper limit voltage.

In addition to the operation signal and the stop signal, voltages are input to the microcomputer 26 from the output circuit 24 and the control circuit 25. In response to the input signals and the voltage that the output circuit 24 has output, the microcomputer 26 outputs, to the control circuit 25, a switching signal instructing switching on or off of the semiconductor switch 20. The switching signal is composed of a high-level voltage and a low-level voltage. The high-level voltage of the switching signal instructs switching on of the semiconductor switch 20, whereas the low-level voltage of the switching signal instructs switching off of the semiconductor switch 20.

In accordance with the voltage input from the output circuit 24, the microcomputer 26 calculates an electric-wire temperature of an electric wire (not shown) that constitutes the current path from the battery 10 to the load 12. The semiconductor switch 20 is provided partway along this electric wire.

If the calculated electric-wire temperature is lower than a predetermined temperature and the operation signal is input, the microcomputer 26 changes the voltage of the switching signal to a high-level voltage. If the calculated electric-wire temperature is higher than or equal to the predetermined temperature or the stop signal is input, the microcomputer 26 changes the voltage of the switching signal to a low-level voltage.

In accordance with the voltage input from the input-voltage detection unit 21, the voltage input from the output circuit 24, and the switching signal input from the microcomputer 26, the control circuit 25 outputs a high-level voltage or a low-level voltage to each of the charging circuit 22 and the discharging circuit 23.

Figures 3, 4:
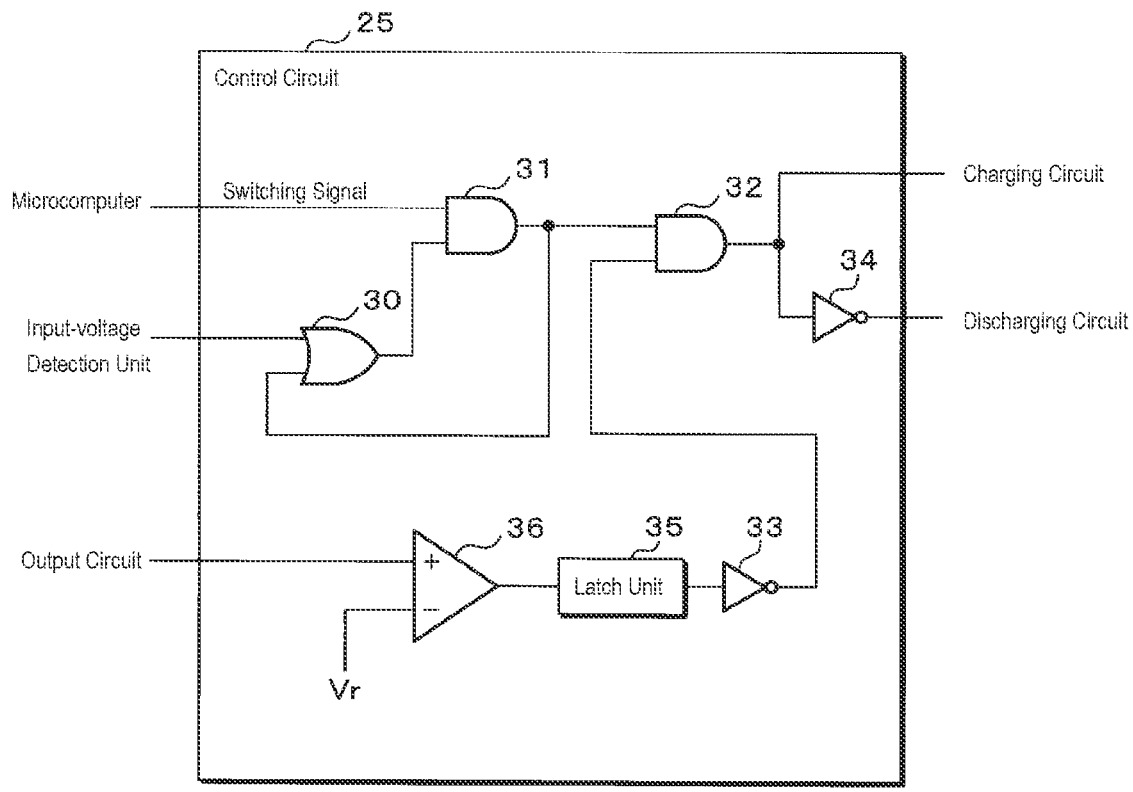
FIG. 3 is a circuit diagram of a control circuit.
FIG. 4 is a table illustrating operations of the control circuit.

FIG. 3 is a circuit diagram of the control circuit 25. The control circuit 25 has an OR circuit 30, AND circuits 31 and 32, inverters 33 and 34, a latch unit 35, and a comparator 36. Each of the OR circuit 30 and the AND circuits 31 and 32 has two input terminals and one output terminal. The comparator 36 has a plus terminal, a minus terminal, and an output terminal.

One of the input terminals of the OR circuit 30 is connected to the input-voltage detection unit 21. Output terminals of the microcomputer 26 and the OR circuit 30 are connected to the two respective input terminals of the AND circuit 31. The output terminal of the AND circuit 31 is connected to the other input terminal of the OR circuit 30 and one input terminal of the AND circuit 32.

The other input terminal of the AND circuit 32 is connected to an output terminal of the inverter 33. An input terminal of the inverter 33 is connected to the latch unit 35. The latch unit 35 is further connected to the output terminal of the comparator 36. The plus terminal of the comparator 36 is connected to the voltage output terminal of the output circuit 24. A reference voltage Vr is input to the minus terminal of the comparator 36. The reference voltage Vr has a constant value. The output terminal of the AND circuit 32 is connected to the charging circuit 22 and an input terminal of and the inverter 34. An output terminal of the inverter 34 is connected to the discharging circuit 23.

A high-level voltage or a low-level voltage is input to the input terminals of the OR circuit 30, the AND circuits 31 and 32, and the inverters 33 and 34. A high-level voltage or a low-level voltage is output from the output terminals of the OR circuit 30, the AND circuits 31 and 32, the inverters 33 and 34, and the comparator 36.

The OR circuit 30 outputs a high-level voltage from its output terminal if a high-level voltage is input to one of its two input terminals, whereas it outputs a low-level voltage from its output terminal if a low-level voltage is input to both of its two input terminals. Each of the AND circuits 31 and 32 outputs a high-level voltage from its output terminal if a high-level voltage is input to both of its two input terminals, whereas it outputs a low-level voltage from its output terminal if a low-level voltage is input to one of its two input terminals. Each of the inverters 33 and 34 outputs a high-level voltage from its output terminal if a low-level voltage is input to its input terminal, whereas it outputs a low-level voltage from its output terminal if a high-level voltage is input to its input terminal.

In the comparator 36, if a voltage input to its plus terminal from the output circuit 24 is lower than the reference voltage Vr input to its minus terminal, the comparator 36 outputs a low-level voltage from its output terminal. In the comparator 36, if the voltage input to its plus terminal from the output circuit 24 is higher than or equal to the reference voltage Vr input to its minus terminal, the comparator 36 outputs a high-level voltage from its output terminal.

A low-level voltage or a high-level voltage is input to the latch unit 35 from the comparator 36. While the comparator 36 outputs a low-level voltage, the latch unit 35 outputs a low-level voltage to the input terminal of the inverter 33. If the voltage that the comparator 36 outputs is switched from a low-level voltage to a high-level voltage, the latch unit 35 outputs a high-level voltage to the input terminal of the inverter 33. Hereafter, regardless of the voltage input from the comparator 36, the latch unit 35 continues outputting a high-level voltage to the input terminal of the inverter 33.

A high-level voltage or a low-level voltage is input to the two respective input terminals of the OR circuit 30 from the input-voltage detection unit 21 and the AND circuit 31. The switching signal composed of a high-level voltage and a low-level voltage is input to the one input terminal of the AND circuit 31 from the microcomputer 26. The control circuit 25 functions as an input unit. A high-level voltage or a low-level voltage is input to the other input terminal of the AND circuit 31 from the OR circuit 30. A high-level voltage or a low-level voltage is input to the two respective input terminals of the AND circuit 32 from the AND circuit 31 and the inverter 33. A high-level voltage or a low-level voltage is input to the charging circuit 22 and the input terminal of the inverter 34 from the AND circuit 32. A high-level voltage or a low-level voltage is input to the discharging circuit 23 from the inverter 34.

FIG. 4 is a table illustrating the operation of the control circuit 25. FIG. 4 shows voltages given by the switching signal that the microcomputer 26 outputs, voltages that the input-voltage detection unit 21 and the comparator 36 output, and output voltages that the AND circuit 31 outputs. In addition, FIG. 4 shows voltages input to the charging circuit 22 and the discharging circuit 23. In FIG. 4, a high-level voltage is indicated by "H" and a low-level voltage is indicated by "L". In the following description of the operations of the control circuit 25, it is assumed that the latch unit 35 outputs a low-level voltage.

As described above, a high-level voltage and a low-level voltage of the switching signal that the microcomputer 26 outputs respectively instruct the switching on and off of the semiconductor switch 20. The fact that the input-voltage detection unit 21 outputs a high-level voltage indicates that the input voltage is higher than or equal to the input-voltage threshold value, whereas the fact that the input-voltage detection unit 21 outputs a low-level voltage indicates that the input voltage is lower than the input-voltage threshold value.

Then, the fact that the comparator 36 outputs a low-level voltage indicates that a voltage that the output circuit 24 has output is lower than the reference voltage Vr, that is, the current flowing through the current path is lower than a predetermined current. Also, the fact that the comparator 36 outputs a high-level voltage indicates that the voltage that the output circuit 24 has output is higher than or equal to the reference voltage Vr, that is, the current flowing through the current path is higher than or equal to the predetermined current.

If the switching signal indicates a low-level voltage, regardless of the voltages that the input-voltage detection unit 21 and the comparator 36 output and the output voltage from the AND circuit 31, the AND circuits 31 and 32 output a low-level voltage, and then the inverter 34 outputs a high-level voltage. Accordingly, a low-level voltage and a high-level voltage are respectively input to the charging circuit 22 and the discharging circuit 23. In this case, the charging circuit 22 stops operating, and then the discharging circuit 23 discharges the power that the capacitor Cs has accumulated. As a result, the semiconductor switch 20 is switched off.

Even if the switching signal indicates a high-level voltage, when the comparator 36 has output a high-level voltage, regardless of the voltage that the input-voltage detection unit 21 outputs and the output voltage from the AND circuit 31, the AND circuit 32 and the inverter 34 respectively output a low-level voltage and a high-level voltage. If the comparator 36 has output a high-level voltage, the voltage that the latch unit 35 outputs to the inverter 33 is switched from a low-level voltage to a high-level voltage. Then, regardless of the voltage that the comparator 36 outputs, the latch unit 35 continues outputting a high-level voltage to the inverter 33. Consequently, after the comparator 36 has output a high-level voltage, a low-level voltage and a high-level voltage are continuously input to the charging circuit 22 and the discharging circuit 23 respectively, and thus the semiconductor switch 20 is switched off. In this manner, if the comparator 36 has output a high-level voltage, the semiconductor switch 20 is switched off. Therefore, a current larger than or equal to the predetermined current does not flow through the current path, and thus it is prevented that an overcurrent flows through the current path.

If the switching signal indicates a high-level voltage, when the input-voltage detection unit 21 and the comparator 36 respectively output a high-level voltage and a low-level voltage, regardless of the output voltage from the AND circuit 31, the AND circuits 31 and 32 output a high-level voltage, and then the inverter 34 outputs a low-level voltage. Accordingly, a high-level voltage and a low-level voltage are respectively input to the charging circuit 22 and the discharging circuit 23. In this case, the charging circuit 22 charges the capacitor Cs, and then the discharging circuit 23 stops operating. As a result, the semiconductor switch 20 is switched on. The control circuit 25 functions also as a driving unit.

If the switching signal indicates a high-level voltage and each of the input-voltage detection unit 21 and the comparator 36 outputs a low-level voltage, when the AND circuit 31 outputs a low-level voltage, that is, when the semiconductor switch 20 is off, the OR circuit 30 outputs a low-level voltage. Accordingly, both of the AND circuits 31 and 32 output a low-level voltage, and the inverter 34 outputs a high-level voltage. As a result, a low-level voltage and a high-level voltage are respectively input to the charging circuit 22 and the discharging circuit 23, and thus the semiconductor switch 20 is kept off.

If the switching signal indicates a high-level voltage and each of the input-voltage detection unit 21 and the comparator 36 outputs a low-level voltage, when the AND circuit 31 outputs a high-level voltage, that is, when the semiconductor switch 20 is on, the OR circuit 30 outputs a high-level voltage. Accordingly, both of the AND circuits 31 and 32 output a high-level voltage, and the inverter 34 outputs a low-level voltage. As a result, a high-level voltage and a low-level voltage are respectively input to the charging circuit 22 and the discharging circuit 23, and thus the semiconductor switch 20 is kept on.

Figure 5:
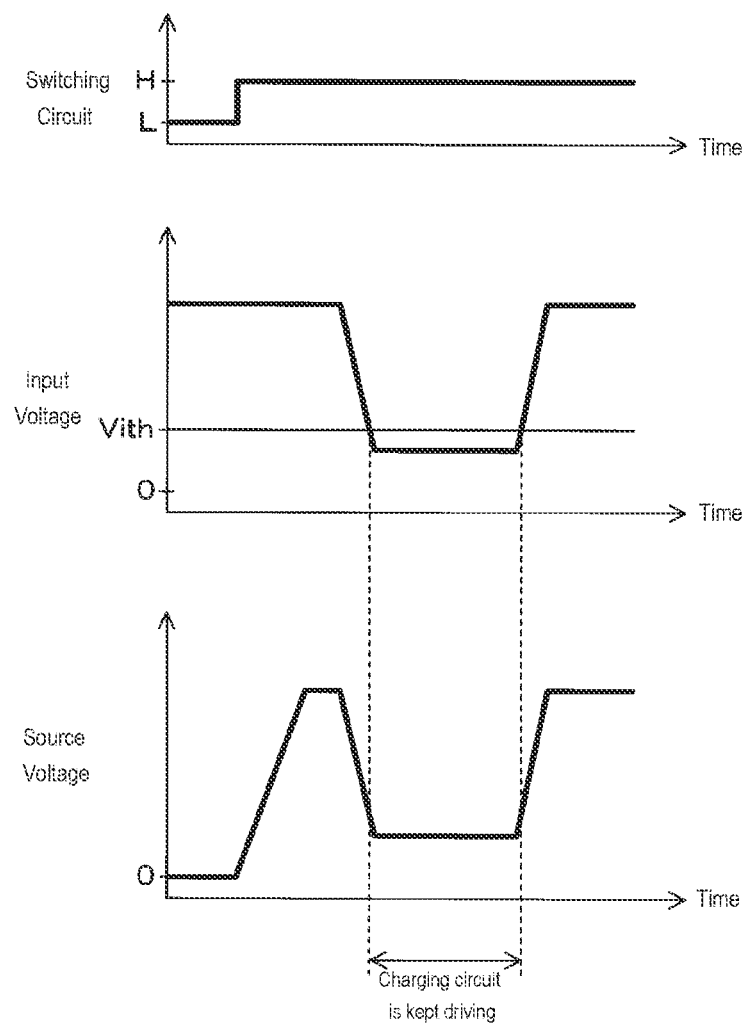
FIG. 5 is a timing chart illustrating operations of the power supply control apparatus.

FIG. 5 is a timing chart illustrating operations of the power supply control apparatus 11. In the following description for the operations of the power supply control apparatus 11, it is assumed that the current flowing through the current path is lower than the predetermined current and the comparator 36 and the latch unit 35 output a low-level voltage. Hereinafter, the voltage at the source of the semiconductor switch 20 is indicated by "source voltage".

In FIG. 5, the graphs of the voltage indicated by the switching signal, the input voltage, and the source voltage are indicated by bold lines, whereas the graph of the input-voltage threshold value Vith is indicated by a narrow line. Similarly to FIG. 4, in FIG. 5, a high-level voltage is indicated by "H" and a low-level voltage is indicated by "L".

If the voltage indicated by the switching signal is switched from a low-level voltage to a high-level voltage, when the input voltage is higher than or equal to the input-voltage threshold value Vith, that is, when the input-voltage detection unit 21 outputs a high-level voltage, the control circuit 25 outputs a high-level voltage and a low-level voltage to the charging circuit 22 and the discharging circuit 23 respectively. As a result, in the state where the cathode of the diode D2 is opened in the discharging circuit 23, the charging circuit 22 starts charging the capacitor Cs. As the voltage across the capacitor Cs rises, the resistance between the drain and source of the semiconductor switch 20 decreases, and the source voltage rises to the input voltage. In the semiconductor switch 20, if the voltage at its gate taking the potential at its source as a reference becomes higher than or equal to the predetermined voltage, the semiconductor switch 20 is switched on, and then the source voltage is approximately the same as the input voltage.

As described above, while the starter 13 operates, the input voltage falls to a voltage that is lower than the input-voltage threshold value Vith, and then the input-voltage detection unit 21 outputs a low-level voltage. While the AND circuit 31 outputs a high-level voltage and the control circuit 25 drives the charging circuit 22, even if the starter 13 operates and the voltage that the input-voltage detection unit 21 outputs is switched from a high-level voltage to a low-level voltage, the AND circuit 31 continues outputting a high-level voltage. Thus, even while the starter 13 operates, the control circuit 25 keeps driving the charging circuit 22.

Accordingly, while the starter 13 operates, the source voltage exceeds zero volts, and then power supply from the battery 10 to the load 12 is continued. As a result, the semiconductor switch 20 is not switched off due to a fall of the input voltage, and thus a sudden cutoff of the supply of power to the load 12 through the current path is prevented.

As described above, the charging circuit 22 generates the constant voltage in accordance with the input voltage, and generates a voltage higher than the input voltage using the generated constant voltage. If the input voltage falls to a voltage that is lower than the input-voltage threshold value, the constant voltage is not generated in accordance with the input voltage, and thus there is a risk that a voltage that the charging circuit 22 outputs to the capacitor falls.

In this way, even if the voltage that the charging circuit 22 outputs to the capacitor falls due to the fall of the input voltage, because the diode D1 is provided, no current flows from the capacitor Cs to the charging circuit 22. Furthermore, because the discharging circuit 23 stops operating, and thus the cathode of the diode D2 is opened. Accordingly, the capacitor Cs does not discharge power, the voltage at the gate of the semiconductor switch 20 taking the potential at the source of the semiconductor switch 20 as a reference is kept, and thus the semiconductor switch 20 is kept on.

If the starter 13 stops operating, the semiconductor switch 20 is kept on, the input voltage returns to a voltage higher than or equal to the input-voltage threshold value, and also the source voltage rises.

Figure 6:
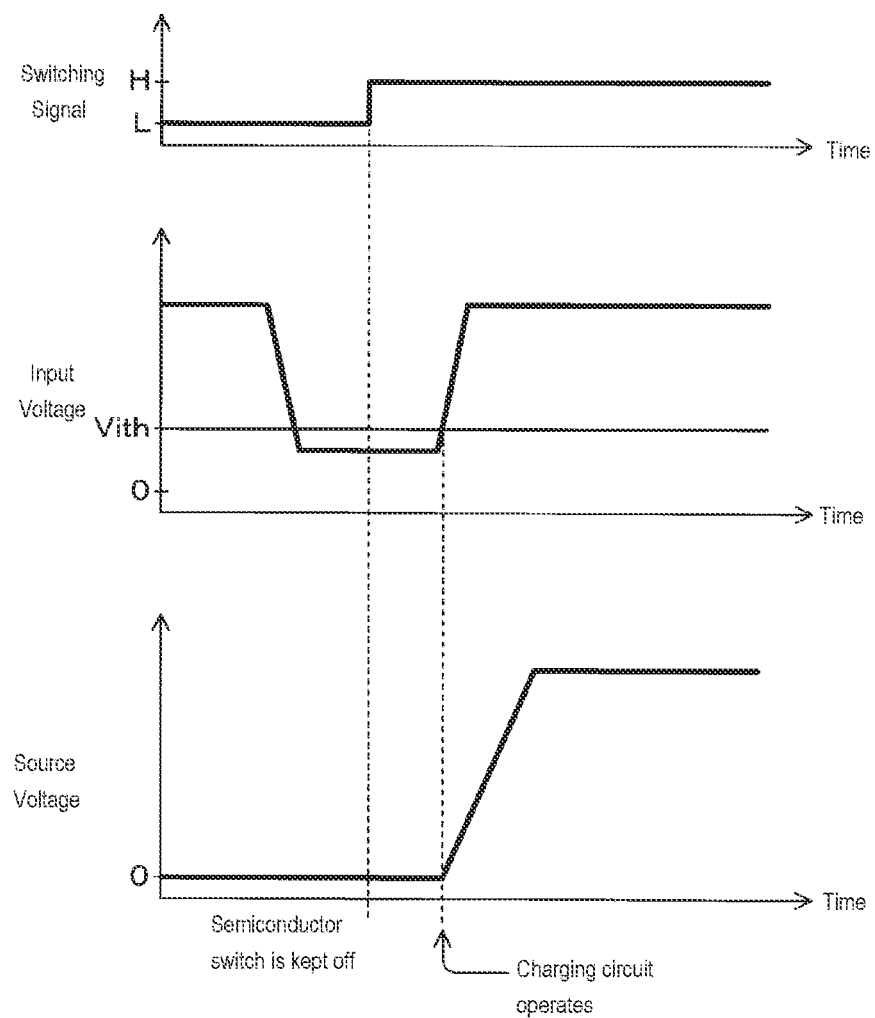
FIG. 6 is a timing chart illustrating other operations of the power supply control apparatus.

FIG. 6 is a timing chart illustrating other operations of the power supply control apparatus 11. Also here, it is assumed that the comparator 36 and the latch unit 35 output a low-level voltage. In FIG. 6, also, the graphs of the voltage indicated by the switching signal, the input voltage, and the source voltage are indicated by bold lines, whereas the graph of the input-voltage threshold value Vith is indicated by a narrow line. Then, similarly to FIG. 5, a high-level voltage is indicated by "H" and a low-level voltage is indicated by "L". At the time when the voltage that the switching signal indicates is switched from a low-level voltage to a high-level voltage in the state where the input voltage is lower than the input-voltage threshold value Vith by the starter 13 operating, the output voltage from the AND circuit 31 is a low-level voltage. Accordingly, the control circuit 25 keeps voltages that are output to the charging circuit 22 and the discharging circuit 23 at low-level voltage and a high-level voltage respectively. As a result, the capacitor Cs is not charged, and thus the semiconductor switch 20 is kept off. Therefore, the source voltage is also kept at zero volts.

If the starter 13 stops operating and the input voltage becomes higher than or equal to the input-voltage threshold value Vith, the voltage that the input-voltage detection unit 21 outputs is switched from a low-level voltage to a high-level voltage, and then a high-level voltage and a low-level voltage are respectively output to the charging circuit 22 and the discharging circuit 23 from the control circuit 25. Therefore, the charging circuit 22 starts charging the capacitor Cs, the source voltage rises to the input voltage, and thus the semiconductor switch 20 is switched on.

Embodiment 2

Figure 7:
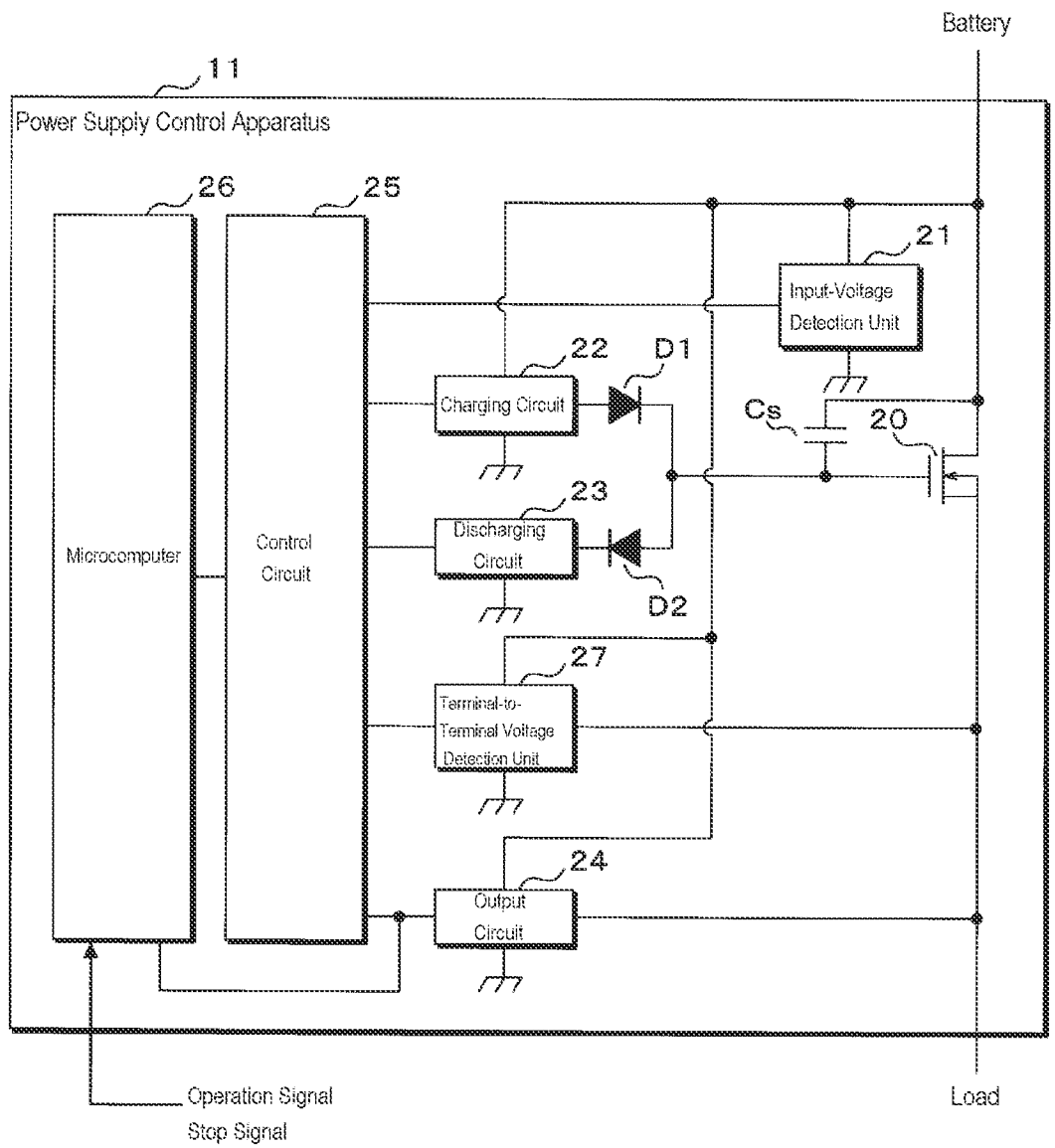
FIG. 7 is a block diagram illustrating a configuration of main portions of a power supply control apparatus according to Embodiment 2.

FIG. 7 is a block diagram illustrating a configuration of main portions of a power supply control apparatus 11 according to Embodiment 2. In Embodiment 2, a configuration of the power supply control apparatus 11 differs. Hereinafter, points of Embodiment 2 that are different from those of Embodiment 1 will be described. Because other configurations other than the configuration to be described later are common to those of Embodiment 1, the same reference numerals as those in Embodiment 1 are attached to the constituent units common to Embodiment 1, and the description is omitted.

Similarly to Embodiment 1, the power supply control apparatus 11 according to Embodiment 2 has the semiconductor switch 20, the input-voltage detection unit 21, the charging circuit 22, the discharging circuit 23, the output circuit 24, the control circuit 25, the microcomputer 26, the capacitor Cs, and the diodes D1 and D2. These are connected in the same manner as in Embodiment 1. Similarly to Embodiment 1, the drain and source of the semiconductor switch 20 is respectively connected to the positive electrode of the battery 10 and the one end of the load 12.

The power supply control apparatus 11 according to Embodiment 2 further has a terminal-to-terminal voltage detection unit 27. The terminal-to-terminal voltage detection unit 27 is separately connected to the drain and source of the semiconductor switch 20 and the control circuit 25. The input-voltage detection unit 21, the charging circuit 22, the discharging circuit 23, the output circuit 24, and the terminal-to-terminal voltage detection unit 27 are also grounded. The terminal-to-terminal voltage detection unit 27 detects a voltage between the drain and source of the semiconductor switch 20 (hereinafter, referred to as "terminal-to-terminal voltage"). If the terminal-to-terminal voltage that the terminal-to-terminal voltage detection unit 27 detects is higher than or equal to a terminal-to-terminal voltage threshold value that is predetermined, the terminal-to-terminal voltage detection unit 27 outputs a high-level voltage to the control circuit 25. If the detected terminal-to-terminal voltage is lower than the terminal-to-terminal voltage threshold value, the terminal-to-terminal voltage detection unit 27 outputs a low-level voltage to the control circuit 25.

If the semiconductor switch 20 is on, as described in Embodiment 1, the voltages at the drain and source of the semiconductor switch 20 taking the ground potential as a reference are approximately equal. Thus, the terminal-to-terminal voltage is approximately zero volts, and is lower than the terminal-to-terminal voltage threshold value. If the semiconductor switch 20 is off, the voltage at the drain of the semiconductor switch 20 is the input voltage that is input from the battery 10 to its drain, and the voltage at the source of the semiconductor switch 20 is zero volts. Accordingly, the terminal-to-terminal voltage is approximately the same as the input voltage, and is higher than or equal to the terminal-to-terminal voltage threshold value.

Figure 8:
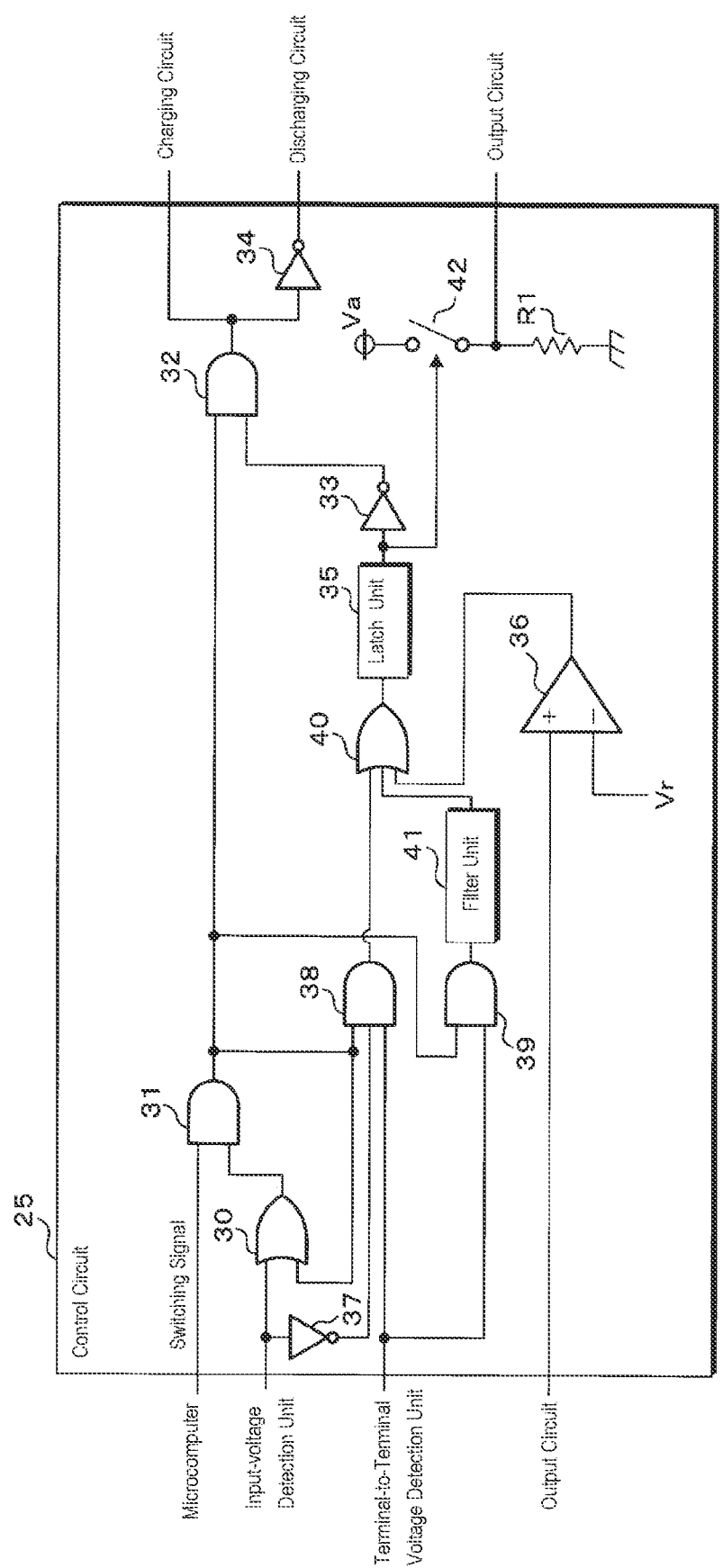
FIG. 8 is a circuit diagram of a control circuit.

FIG. 8 is a circuit diagram of the control circuit 25. Similarly to Embodiment 1, the control circuit 25 according to Embodiment 2 has an OR circuit 30, AND circuits 31 and 32, inverters 33 and 34, a latch unit 35, and a comparator 36. The input-voltage detection unit 21, the charging circuit 22, the discharging circuit 23, the microcomputer 26, the OR circuit 30, the AND circuits 31 and 32, the inverters 33 and 34, and the latch unit 35 are connected in the same manner as in Embodiment 1. Also, similarly to Embodiment 1, the plus terminal of the comparator 36 is connected to the voltage output terminal of the output circuit 24, whereas the reference voltage Vr is input to the minus terminal of the comparator 36.

The control circuit 25 according to Embodiment 2 further has an inverter 37, AND circuits 38 and 39, an OR circuit 40, a filter unit 41, a switch 42, and a resistor R1. Each of the AND circuit 38 and the OR circuit 40 has three input terminals and one output terminal. The AND circuit 39 has two input terminals and one output terminal.

An input terminal of the inverter 37 is connected to the input-voltage detection unit 21. Output terminals of the terminal-to-terminal voltage detection unit 27 and the AND circuit 31 and an output terminal of the inverter 37 are respectively connected to the three input terminals of the AND circuit 38. The output terminals of the terminal-to-terminal voltage detection unit 27 and the AND circuit 31 are respectively connected to the two input terminals of the AND circuit 39. The output terminal of the AND circuit 39 is connected to the filter unit 41. The output terminal of the comparator 36, the output terminal of the AND circuit 38, and the filter unit 41 are respectively connected to the three input terminals of the OR circuit 40. The output terminal of the OR circuit 40 is connected to the latch unit 35.

A second constant voltage Va is applied to one end of the switch 42. The other end of the switch 42 is connected to one end of the resistor R1, and the other end of the resistor R1 is grounded. The one end of the resistor R1 is further connected to the voltage output terminal of the output circuit 24.

A high-level voltage or a low-level voltage is input to the input terminals of the OR circuits 30 and 40, the AND circuits 31, 32, 38, and 39, and the inverters 33, 34, and 37. A high-level voltage or a low-level voltage is output from the output terminals of the OR circuits 30 and 40, the AND circuits 31, 32, 38, and 39, the inverters 33, 34, and 37, and the comparator 36.

If a high-level voltage is input to all of its three input terminals, the AND circuit 38 outputs a high-level voltage from its output terminal, whereas if a low-level voltage is input to at least one of its three input terminals, the AND circuit 38 outputs a low-level voltage from its output terminal. The inverter 37 functions in the same manner as the inverters 33 and 34. The AND circuit 39 functions in the same manner as the AND circuits 31 and 32. If a high-level voltage is input to at least one of its three input terminals, the OR circuit 40 outputs, a high-level voltage from its output terminal, whereas if a low-level voltage is input to all of its three input terminals, the OR circuit 40 outputs a low-level voltage from its output terminal.

A high-level voltage or a low-level voltage is input to the two respective input terminals of the OR circuit 30 from the input-voltage detection unit 21 and the AND circuit 31. The switching signal is input to the one input terminal of the AND circuit 31 from the microcomputer 26, whereas a high-level voltage or a low-level voltage is input to the other input terminal of the AND circuit 31 from the OR circuit 30. A high-level voltage or a low-level voltage is input to the input terminal of the inverter 37 from the input-voltage detection unit 21. A high-level voltage or a low-level voltage is input to the three respective input terminals of the AND circuit 38 from the terminal-to-terminal voltage detection unit 27, the AND circuit 31, and the inverter 37. A high-level voltage or a low-level voltage is input to the two respective input terminals of the AND circuit 39 from the terminal-to-terminal voltage detection unit 27 and the AND circuit 31. A high-level voltage or a low-level voltage is input to the two respective input terminals of the OR circuit 40 from the comparator 36 and the AND circuit 38.

A high-level voltage or a low-level voltage is input to the filter unit 41 from the AND circuit 39. If the AND circuit 39 continuously outputs a high-level voltage for a predetermined time period, the filter unit 41 outputs a high-level voltage to the remaining one input terminal of the OR circuit 40, whereas if the AND circuit 39 does not continuously output a high-level voltage for the predetermined time period, the filter unit 41 outputs a low-level voltage to the remaining one input terminal of the OR circuit 40.

The filter unit 41, for example, periodically detects the voltage that the AND circuit 39 outputs. When continuously detecting a high-level voltage for a predetermined number of times, the filter unit 41 outputs a high-level voltage to the input terminal of the OR circuit 40, whereas when not continuously detecting a high-level voltage for the predetermined number of times, the filter unit 41 outputs a low-level voltage to the input terminal of the OR circuit 40.

A low-level voltage or a high-level voltage is input to the latch unit 35 from the OR circuit 40. While the OR circuit 40 outputs a low-level voltage, the latch unit 35 outputs a low-level voltage to the input terminal of the inverter 33. If the voltage that the OR circuit 40 outputs is switched from a low-level voltage to a high-level voltage, the latch unit 35 outputs a high-level voltage to the input terminal of the inverter 33. Hereafter, regardless of the voltage input from the OR circuit 40, the latch unit 35 continues outputting a high-level voltage to the input terminal of the inverter 33.

A high-level voltage or a low-level voltage is input to the two respective input terminals of the AND circuit 32 from the AND circuit 31 and the inverter 33. A high-level voltage or a low-level voltage is input to the charging circuit 22 and the input terminal of the inverter 34 from the AND circuit 32. A high-level voltage or a low-level voltage is input to the discharging circuit 23 from the inverter 34.

While the latch unit 35 outputs a low-level voltage, the switch 42 is off. If the switch 42 is off, a voltage within a predetermined range that the output circuit 24 has output is input to the microcomputer 26 and the minus terminal of the comparator 36. If the latch unit 35 has output a high-level voltage, the switch 42 is switched on. The second constant voltage Va exceeds the upper limit voltage of the voltage that the output circuit 24 outputs. Thus, if the switch 42 is on, the aforementioned second constant voltage Va that is the voltage out of the predetermined range is input to the microcomputer 26 and the plus terminal of the comparator 36. Because the second constant voltage Va exceeds the reference voltage Vr, if the switch 42 is on, the comparator 36 outputs a high-level voltage.

FIG. 9 is a table illustrating operations of the control circuit 25. FIG. 9 shows voltages indicated by the switching signal that the microcomputer 26 outputs, voltages output from the input-voltage detection unit 21, the comparator 36, the terminal-to-terminal voltage detection unit 27, and the filter unit 41, and output voltages from the AND circuit 31. In addition, FIG. 9 shows voltages input to the latch unit 35, the charging circuit 22, and the discharging circuit 23. Also in FIG. 9, a high-level voltage is indicated by "H" and a low-level voltage is indicated by "L". In the following description of the operations of the control circuit 25, it is assumed that the latch unit 35 outputs a low-level voltage.

If the switching signal indicates a low-level voltage, regardless of the voltages output from the input-voltage detection unit 21, the comparator 36, the terminal-to-terminal voltage detection unit 27, and the filter unit 41 and the output voltage from the AND circuit 31, the AND circuits 31 and 32 output a low-level voltage, and then the inverter 34 outputs a high-level voltage. Accordingly, a low-level voltage and a high-level voltage are respectively input to the charging circuit 22 and the discharging circuit 23, and thus the semiconductor switch 20 is switched off. A voltage input to the latch unit 35 depends on the voltages output from the input-voltage detection unit 21, the terminal-to-terminal voltage detection unit 27, the comparator 36, and the filter unit 41 and the output voltage from the AND circuit 31.

Even if the switching signal indicates a high-level voltage, when the comparator 36 outputs a high-level voltage, regardless of the voltages output from the input-voltage detection unit 21, the terminal-to-terminal voltage detection unit 27, and the filter unit 41 and the output voltage from the AND circuit 31, the OR circuit 40 outputs a high-level voltage, and then the voltage input to the latch unit 35 is switched to a high-level voltage. Accordingly, the latch unit 35 outputs a high-level voltage, the AND circuit 32 outputs a low-level voltage, and then the inverter 34 outputs a high-level voltage. Therefore, a low-level voltage and a high-level voltage are respectively input to the charging circuit 22 and the discharging circuit 23, and thus the semiconductor switch 20 is switched off. After the voltage output from the OR circuit 40 was switched to a high-level voltage, the latch unit 35 continues outputting a high-level voltage regardless of the voltage input from the OR circuit 40, and thus the semiconductor switch 20 is kept off.

If the latch unit 35 has output a high-level voltage, the second constant voltage Va is input to the microcomputer 26, and then an abnormality is notified to the microcomputer 26. If the second constant voltage Va is input, the microcomputer 26 stops calculating the electric-wire temperature for example, and then informs a user of the abnormality by lighting a lamp (not shown) or displaying a message on a display unit (not shown).

If the voltage indicated by the switching signal, the voltage that the input-voltage detection unit 21 has output, and the voltage that the terminal-to-terminal voltage detection unit 27 outputs are a high-level voltage, when the comparator 36 and the filter unit 41 output a low-level voltage, regardless of the output voltage from the AND circuit 31, the AND circuit 32 outputs a high-level voltage, and then the inverter 34 outputs a low-level voltage. As a result, a high-level voltage and a low-level voltage are respectively input to the charging circuit 22 and the discharging circuit 23, and thus the semiconductor switch 20 is switched on. Because the input-voltage detection unit 21 and the filter unit 41 respectively output a high-level voltage and a low-level voltage, the voltage input to the latch unit 35 is a low-level voltage, and then the latch unit 35 continues outputting a low-level voltage.

However, in such a state, if the source voltage does not rise and the terminal-to-terminal voltage detection unit 27 continues outputting a high-level voltage for a predetermined time period, the voltage that the filter unit 41 outputs is switched from a low-level voltage to a high-level voltage, and then the input voltage to the latch unit 35 is switched to a high-level voltage. Accordingly, the latch unit 35 outputs a high-level voltage, the AND circuit 32 outputs a low-level voltage, and then the inverter 34 outputs a high-level voltage. Therefore, a low-level voltage and a high-level voltage are respectively input to the charging circuit 22 and the discharging circuit 23, and thus the semiconductor switch 20 is switched off. After the voltage output from the OR circuit 40 was switched to a high-level voltage, the latch unit 35 continues outputting a high-level voltage regardless of the voltage input from the OR circuit 40, and thus the semiconductor switch 20 is kept off. As described above, if the latch unit 35 has output a high-level voltage, the switch 42 is switched on, the second constant voltage Va is input to the microcomputer 26, and then an abnormality is notified to the microcomputer 26.

If the terminal-to-terminal voltage of the semiconductor switch 20 is higher than or equal to the terminal-to-terminal voltage threshold value Vith despite that the charging circuit 22 operates in the state where the discharging circuit 23 stops operating, this means occurrence of an abnormality such as malfunction of the charging circuit 22 or disconnection between the charging circuit 22 and the capacitor Cs.

If the voltage indicated by the switching signal and the voltage that the input-voltage detection unit 21 has output are a high-level voltage and the voltages that the terminal-to-terminal voltage detection unit 27 and the comparator 36 output are a low-level voltage, regardless of the output voltage from the AND circuit 31, the filter unit 41 outputs a low-level voltage, and then a low-level voltage is input to the latch unit 35. The AND circuit 31 and the latch unit 35 respectively output a high-level voltage and a low-level voltage, and then the AND circuit 32 and the inverter 34 respectively output a high-level voltage and a low-level voltage. As a result, a high-level voltage and a low-level voltage are respectively input to the charging circuit 22 and the discharging circuit 23, and thus the semiconductor switch 20 is switched on.

Even if the voltage indicated by the switching signal and the output voltage from the AND circuit 31 are a high-level voltage and the voltage that the comparator 36 outputs is a low-level voltage, when the voltages that the input-voltage detection unit 21 and the terminal-to-terminal voltage detection unit 27 output are respectively a low-level voltage and the high-level voltage, a high-level voltage is input to the latch unit 35 regardless of the voltage that the filter unit 41 outputs. As a result, the latch unit 35 outputs a high-level voltage, the AND circuit 32 and the inverter 34 respectively output a low-level voltage and a high-level voltage. Therefore, a low-level voltage and a high-level voltage are respectively input to the charging circuit 22 and the discharging circuit 23, and thus the semiconductor switch 20 is switched off. After the voltage output from the OR circuit 40 was switched to a high-level voltage, the latch unit 35 continues outputting a high-level voltage regardless of the voltage input from the OR circuit 40, and thus the semiconductor switch 20 is kept off.

The state shown above is a state in which, even though the semiconductor switch 20 is on, the input voltage is lower than the input-voltage threshold value and the terminal-to-terminal voltage of the semiconductor switch 20 is higher than or equal to the terminal-to-terminal voltage threshold value. As described in Embodiment 1, in accordance with the input voltage, the output circuit 24 generates a voltage that is output to the control circuit 25 and the microcomputer 26. Thus, the output circuit 24 cannot generate a voltage that exceeds the input voltage. Accordingly, if the input voltage is lower than the input-voltage threshold value, there is a risk that the output circuit 24 outputs a voltage that is lower than the reference voltage Vr despite that a current larger than or equal to the predetermined current flows through the current path.

Therefore, if the input voltage is lower than the input-voltage threshold value and the terminal-to-terminal voltage of the semiconductor switch 20 is higher than or equal to the terminal-to-terminal voltage threshold value, it is assumed that there is a possibility that the source of the semiconductor switch 20 is grounded, and thus the semiconductor switch 20 is switched off. As described above, if the latch unit 35 has output a high-level voltage, the switch 42 is switched on, the second constant voltage Va is input to the microcomputer 26, and then an abnormality is notified to the microcomputer 26.

If the terminal-to-terminal voltage detection unit 27 and the comparator 36 output a low-level voltage, the filter unit 41 outputs a low-level voltage, and then a low-level voltage is input to the latch unit 35. Accordingly, if the terminal-to-terminal voltage detection unit 27 and the comparator 36 output a low-level voltage, the latch unit 35 continues outputting a low-level voltage as long as its output voltage has not been switched to a high-level voltage.

Even if the input-voltage detection unit 21 outputs a low-level voltage in the state where the voltage indicated by the switching signal is a high-level voltage, when the output voltage from the AND circuit 31 is a high-level voltage and the voltages output from the terminal-to-terminal voltage detection unit 27 and the comparator 36 are a low-level voltage, the AND circuit 32 and the inverter 34 respectively output a high-level voltage and a low-level voltage. As a result, a high-level voltage and a low-level voltage are respectively input to the charging circuit 22 and the discharging circuit 23, and thus the semiconductor switch 20 is switched on.

If the switching signal indicates a high-level voltage and each of the input-voltage detection unit 21 and the comparator 36 outputs a low-level voltage, when the AND circuit 31 outputs a low-level voltage, that is, when the semiconductor switch 20 is off, the OR circuit 30 outputs a low-level voltage. Accordingly, both of the AND circuits 31 and 32 output a low-level voltage, and then the inverter 34 outputs a high-level voltage. As a result, a low-level voltage and a high-level voltage are respectively input to the charging circuit 22 and the discharging circuit 23, and thus the semiconductor switch 20 is kept off.

Also in the power supply control apparatus 11 according to Embodiment 2, if the terminal-to-terminal voltage of the semiconductor switch 20 is lower than the terminal-to-terminal voltage threshold value, the semiconductor switch 20 is kept on even if the input voltage falls below the input-voltage threshold value by the starter 13 operating in the state where the semiconductor switch 20 is on. In other words, even if the state transits, by the starter 13 operating, from the fifth state from the top in FIG. 9 to the seventh state from the top in FIG. 9, the semiconductor switch 20 is kept on. Furthermore, in the state where the input voltage is lower than the input-voltage threshold value, if the voltage indicated by the switching signal is switched from a low-level voltage to a high-level voltage, because the output voltage from the AND circuit 31 is a low-level voltage, the semiconductor switch 20 is kept off without being switched from off to on.

Figure 10:
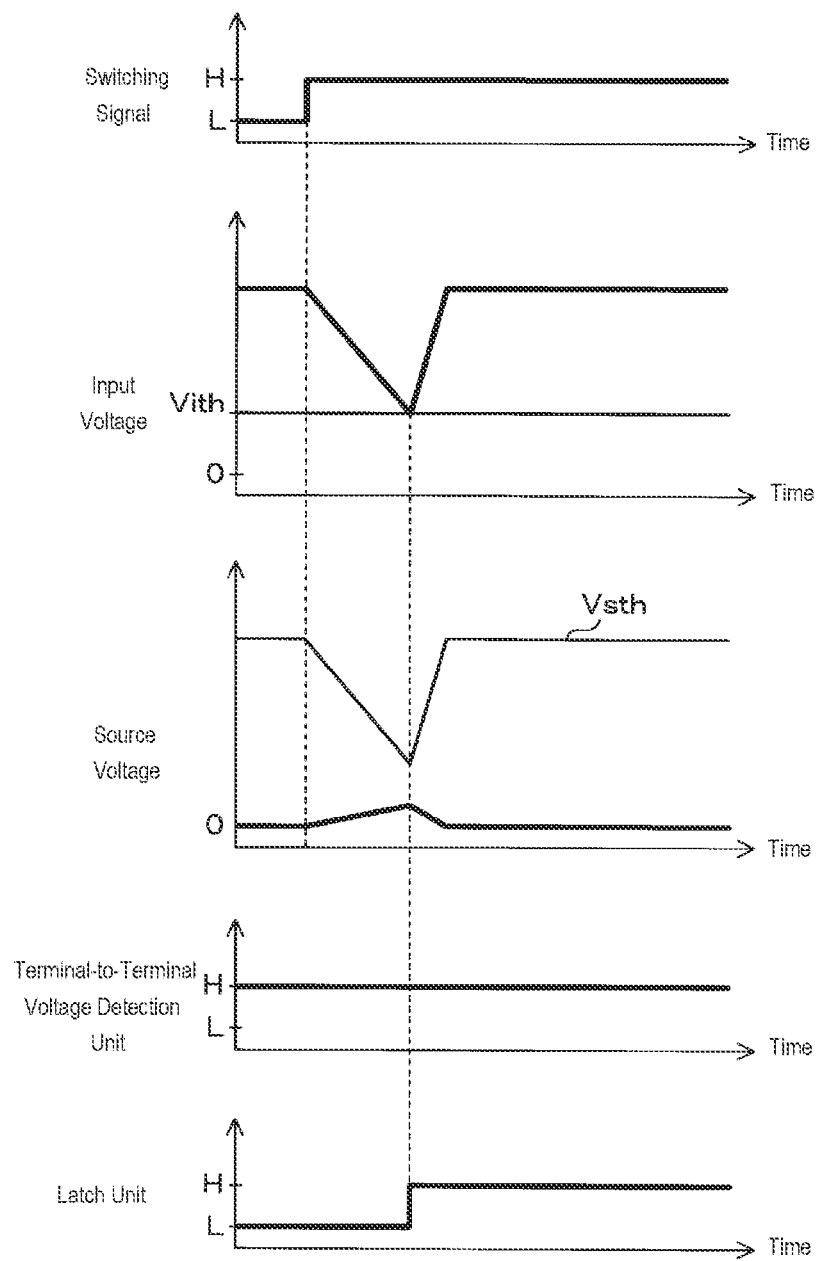
FIG. 10 is a timing chart illustrating operations of the power supply control apparatus.

FIG. 10 is a timing chart illustrating other operations of the power supply control apparatus 11. In the following description for the operations of the power supply control apparatus 11, it is assumed that the comparator 36 and the latch unit 35 output a low-level voltage and the battery 10 has deteriorated. If the battery 10 deteriorates, the resistance value of the internal resistance of the battery 10 increases, and thus the voltage drop at the internal resistance becomes large. Accordingly, even if the starter 13 is not operating, the input voltage, which is input from the battery 10 to the drain of the semiconductor switch 20 when the semiconductor switch 20 is switched from off to on, falls to a voltage that is lower than the input-voltage threshold value. Also, in the description of the operations of the power supply control apparatus 11, it is assumed that the starter 13 does not operate.

In FIG. 10, the graphs of the switching signal, the input voltage, the source voltage, the voltage that the terminal-to-terminal voltage detection unit 27 outputs, and the voltage that the latch unit 35 outputs are indicated by bold lines. In addition, the graphs of the input-voltage threshold value Vith and the source-voltage threshold value Vsth are indicated by narrow lines. The source-voltage threshold value Vsth is a threshold value for determining whether the terminal-to-terminal voltage is higher than or equal to the terminal-to-terminal voltage threshold value. If the source voltage exceeds the source-voltage threshold value Vsth, the terminal-to-terminal voltage is lower than the terminal-to-terminal voltage threshold value, whereas if the source voltage is lower than or equal to the source-voltage threshold value Vsth, the terminal-to-terminal voltage is higher than or equal to the terminal-to-terminal voltage threshold value. The source-voltage threshold value Vsth is a voltage that is lower than the input voltage by a predetermined reference voltage, for example, by only one volt. Similarly to FIG. 9, also in FIG. 10, a high-level voltage is indicated by "H" and a low-level voltage is indicated by "L".

If the switching signal indicates a low-level voltage, the semiconductor switch 20 is off. Because the starter 13 is not operating, the input voltage is higher than or equal to the input-voltage threshold value Vith, and then the source voltage is zero volts. Accordingly, the source voltage is lower than or equal to the source-voltage threshold value Vsth, and then the terminal-to-terminal voltage detection unit 27 outputs a high-level voltage.

If the voltage indicated by the switching signal is switched from a low-level voltage to a high-level voltage, although the terminal-to-terminal voltage detection unit 27 outputs a high-level voltage, the input-voltage detection unit 21 outputs a high-level voltage and the time period for which a high-level voltage is continuously input to the filter unit 41 is shorter than the predetermined time period. Accordingly, for switching the semiconductor switch 20 on, the charging circuit 22 starts charging the capacitor Cs in the state where the discharging circuit 23 stops operating.

As the voltage across the capacitor Cs rises by the charging circuit 22 being charged, the resistance value between the drain and source of the semiconductor switch 20 decreases, and then a current flows from the battery 10 to the load 12 via the semiconductor switch 20. As a result, the source voltage rises. Also, as the current flowing from the battery 10 to the load 12 increases, the voltage drop at the internal resistance of the battery 10 increases, and thus the input voltage also falls. Because the resistance value of the internal resistance is large, the input voltage significantly falls.

If the source of the semiconductor switch 20 is grounded, at the time when the input voltage becomes lower than the input-voltage threshold value Vith, the source voltage is lower than the source-voltage threshold value Vsth, and the terminal-to-terminal voltage detection unit 27 outputs a high-level voltage. In this case, the latch unit 35 outputs a high-level voltage. Accordingly, the charging circuit 22 stops operating and the discharging circuit 23 discharges power that the capacitor Cs has accumulated, and thus the semiconductor switch 20 is switched off.

As the voltage across the capacitor Cs falls in accordance with discharge by the discharging circuit 23, the resistance value between the drain and source of the semiconductor switch 20 rises, and then the current flowing from the battery 10 to the load 12 decreases. As a result, the input voltage rises, whereas the source voltage falls. By the semiconductor switch 20 being switched off, the input voltage returns to a voltage that is higher than or equal to the input-voltage threshold value Vith. However, because the latch unit 35 continues outputting a high-level voltage, the semiconductor switch 20 is kept off.

Also, at the time when a predetermined time period has elapsed since the voltage indicated by the switching signal has been switched from a low-level voltage to a high-level voltage, the voltage that the filter unit 41 outputs is also switched from a low-level voltage to a high-level voltage. Furthermore, not only if the internal resistance of the battery 10 increases, but also if the resistance value of the electric wire between the positive electrode of the battery 10 and the drain of the semiconductor switch 20 increases, when the source of the semiconductor switch 20 is grounded, the input voltage and the source voltage behave similarly, and thus the semiconductor switch 20 is switched off.

At the time when the charging circuit 22 starts charging the capacitor Cs for switching the semiconductor switch 20 on, naturally, the source voltage is lower than the source-voltage threshold value Vsth. For this reason, in the state where the source of the semiconductor switch 20 is not grounded, a predetermined time period required for operating the filter unit 41 is set to be longer than or equal to a time period from when the charging circuit 22 starts charging to when the source voltage reaches the source-voltage threshold value Vsth.

As described above, in a case of driving the charging circuit 22, when the input-voltage detection unit 21 has output a low-level voltage and the terminal-to-terminal voltage detection unit 27 has output a high-level voltage, the control circuit 25 stops the operation of the charging circuit 22 and drives the discharging circuit 23. Therefore, even if the comparator 36 does not normally function because the input voltage is low, the flowing of an overcurrent to the semiconductor switch 20, which is caused by the source of the semiconductor switch 20 being grounded, is prevented.

FIG. 11 is a timing chart illustrating other operations of the power supply control apparatus 11. In the following description for the operations of the power supply control apparatus 11, it is assumed that the comparator 36 and the latch unit 35 output a low-level voltage and the starter 13 does not operates.

Similarly to FIG. 10, also in FIG. 11, the graphs of the switching signal, the input voltage, the source voltage, the voltage that the terminal-to-terminal voltage detection unit 27 outputs, and the voltage that the latch unit 35 outputs are indicated by bold lines. Also, the graphs of the input-voltage threshold value Vith and the source-voltage threshold value Vsth are indicated by narrow lines. In addition, similarly to FIG. 10, a high-level voltage is indicated by "H" and a low-level voltage is indicated by "L".

If the switching signal indicates a low-level voltage, the semiconductor switch 20 is off. Because the starter 13 is not operating, the input voltage is higher than or equal to the input-voltage threshold value Vith, and the source voltage is zero volts. Accordingly, the source voltage is lower than or equal to the source-voltage threshold value Vsth, and then the terminal-to-terminal voltage detection unit 27 outputs a high-level voltage. It is assumed that the latch unit 35 outputs a low-level voltage.

If the voltage indicated by the switching signal is switched from a low-level voltage to a high-level voltage, although the terminal-to-terminal voltage detection unit 27 outputs a high-level voltage, the input-voltage detection unit 21 outputs a high-level voltage and the time period for which a high-level voltage is continuously input to the filter unit 41 is shorter than the predetermined time period. Accordingly, for switching the semiconductor switch 20 on, the charging circuit 22 starts charging the capacitor Cs in the state where the discharging circuit 23 stops operating.

Due to malfunction of the charging circuit 22, for example, even if the predetermined time period has elapsed since the voltage indicated by the switching signal has been switched from a low-level voltage to a high-level voltage, when the source voltage has not exceeded the source-voltage threshold value Vsth, the filter unit 41 outputs a high-level voltage, and the latch unit 35 outputs a high-level voltage. Accordingly, the charging circuit 22 stops operating and the discharging circuit 23 discharges power that the capacitor Cs has accumulated, and thus the semiconductor switch 20 is switched off. After the voltage that the OR circuit 40 outputs was switched to a high-level voltage, the latch unit 35 continues outputting a high-level voltage regardless of the voltage input from the OR circuit 40, and thus the semiconductor switch 20 is kept off. If the semiconductor switch 20 is switched off, the source voltage returns to zero volts.

As described above, in the case of driving the charging circuit 22, when the terminal-to-terminal voltage detection unit 27 outputs a high-level voltage for the predetermined time period or longer, the control circuit 25 stops the operation of the charging circuit 22 and drives the discharging circuit 23. Accordingly, if the semiconductor switch 20 cannot be switched on due to malfunction, power supply from the battery 10 to the load 12 through the current path is stopped, and thus wasteful power consumption is prevented. In a configuration in which the microcomputer 26 stops calculating the electric-wire temperature if the second constant voltage Va is input from the control circuit 25 to the microcomputer 26, wasteful power consumption is further prevented.

Also, if the control circuit 25 stops the operation of the charging circuit 22 and drives the discharging circuit 23 by the latch unit 35 outputting a high-level voltage, the voltage at the voltage output terminal from which the output circuit 24 outputs a voltage is adjusted to a voltage out of the predetermined range by switching the switch 42 on. In this manner, it is possible to notify the microcomputer 26 that power supply through the current path cannot be normally performed. The control circuit 25 also functions as an adjusting unit.

Note that, in Embodiments 1 and 2, the semiconductor switch 20 is not limited to an N-channel FET, but may also be an NPN bipolar transistor. In this case, the drain, the source, and the gate of the semiconductor switch 20 respectively correspond to the collector, the emitter, and the base of the bipolar transistor. Also, a connection point of the capacitor Cs is not limited to between the drain and gate of the semiconductor switch 20. Because the capacitor Cs may be a capacitor whose one end is connected to the gate, it thus may be a capacitor that is connected between the gate and source of the semiconductor switch 20 for example. If the one end of the capacitor Cs is connected to the gate, by the charging circuit 22 charging the capacitor Cs in the state where the discharging circuit 23 stops operating, the voltage at the gate of the semiconductor switch 20 taking a potential at the source of the semiconductor switch 20 as a reference rises, and thus the semiconductor switch 20 is switched on. Also, by the discharging circuit 23 performing discharge of power from the capacitor Cs in the state where the charging circuit 22 stops operating, the voltage at the gate of the semiconductor switch 20 taking a potential at the source of the semiconductor switch 20 as a reference falls, and thus the semiconductor switch 20 is switched off. If the charging circuit 22 and the discharging circuit 23 stop operating, the voltage across the capacitor Cs is kept.

Embodiments 1 and 2 that were disclosed are to be considered exemplary in all respects and in no way limiting. The scope of the present description is defined by the scope of the appended claims and not by the above description, and all changes that fall within the same essential spirit as the scope of the claims are included therein.

LIST OF REFERENCE NUMERALS

11 Power supply control apparatus
20 Semiconductor switch
21 Input-voltage detection unit
22 Charging circuit
23 Discharging circuit
24 Output circuit
25 Control circuit (input unit, driving unit, adjusting unit)
27 Terminal-to-terminal voltage detection unit
Cs Capacitor
D1 Diode

The invention claimed is:

1. A power supply control apparatus including a semiconductor switch that is provided in a current path and is switched on if a voltage at its control terminal becomes higher than or equal to a predetermined voltage, whereas is switched off if the voltage at the control terminal becomes lower than the predetermined voltage, the power supply control apparatus being configured to control power supply through the current path by switching the semiconductor switch on or off, the power supply control apparatus comprising:
a capacitor whose one end is connected to the control terminal;
a charging circuit configured to charge the capacitor;
a diode configured to prevent a current from flowing through the charging circuit from the capacitor;
an input-voltage detection unit configured to detect an input voltage that is input to a current input terminal in the semiconductor switch;
an input unit to which a switching signal instructing switching on or off of the semiconductor switch is input; and
a driving unit configured to, if the switching signal input to the input unit instructs switching on of the semiconductor switch, drive the charging circuit when the voltage that the input-voltage detection unit has detected is higher than or equal to an input-voltage threshold value,
wherein, while operating the charging circuit, the driving unit keeps driving the charging circuit even if the voltage that the input-voltage detection unit has detected becomes lower than the input-voltage threshold value.

2. The power supply control apparatus according to claim 1, comprising:
a terminal-to-terminal voltage detection unit configured to detect a voltage between the input terminal of the semiconductor switch and a current output terminal in the semiconductor switch; and
a discharging circuit configured to discharge power that the capacitor has accumulated,
wherein, if the driving unit drives the charging circuit, when the voltage that the input-voltage detection unit has detected becomes lower than the input-voltage threshold value and the voltage that the terminal-to-terminal voltage detection unit has detected becomes higher than or equal to a terminal-to-terminal voltage threshold value, the driving unit stops operation of the charging circuit and drives the discharging circuit.

3. The power supply control apparatus according to claim 1, comprising:
a terminal-to-terminal voltage detection unit configured to detect a voltage between the input terminal of the semiconductor switch and a current output terminal in the semiconductor switch; and
a discharging circuit configured to discharge power that the capacitor has accumulated,
wherein, if the driving unit drives the charging circuit and a voltage that the terminal-to-terminal voltage detection unit has detected is higher than or equal to a terminal-to-terminal voltage threshold value continues for a predetermined time period or longer, the driving unit stops operation of the charging circuit and drives the discharging circuit.

4. The power supply control apparatus according to claim 2, comprising:
an output circuit configured to output a voltage within a predetermined range depending on a current flowing through the current path; and
an adjusting unit configured to, if the driving unit stops the operation of the charging circuit and drives the discharging circuit, adjust the voltage at a voltage output terminal from which the output circuit outputs the voltage to a voltage out of the predetermined range.

* * * * *